M. R. HATFIELD.
EGG INSPECTING MACHINE.
APPLICATION FILED AUG. 18, 1916.
1,221,730.
Patented Apr. 3, 1917.
2 SHEETS—SHEET 1.
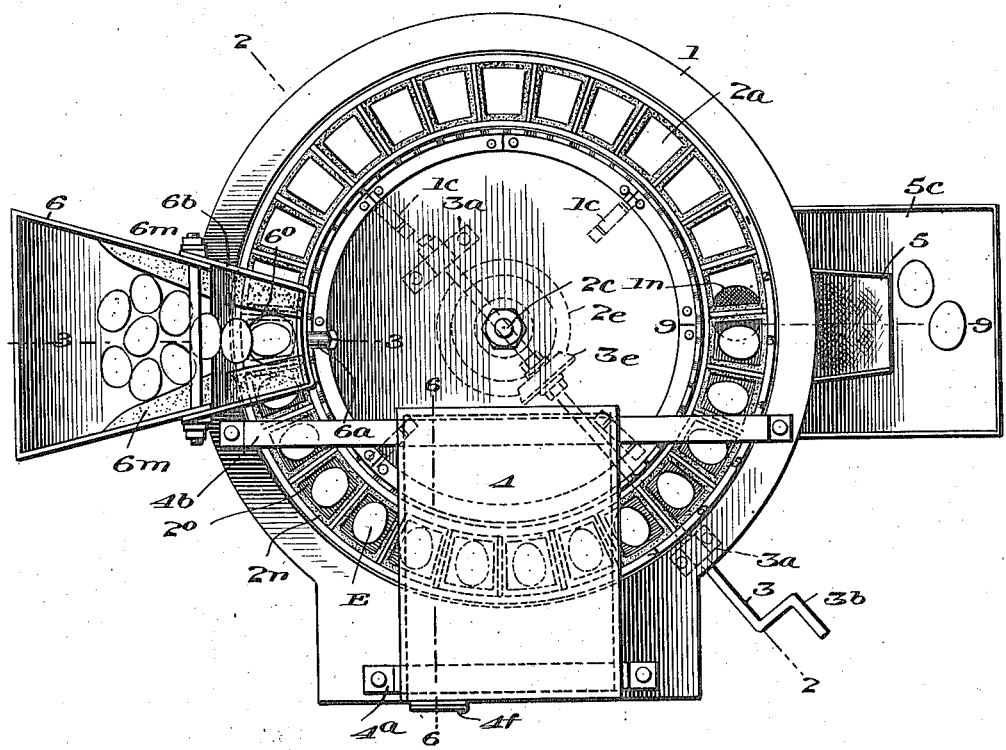
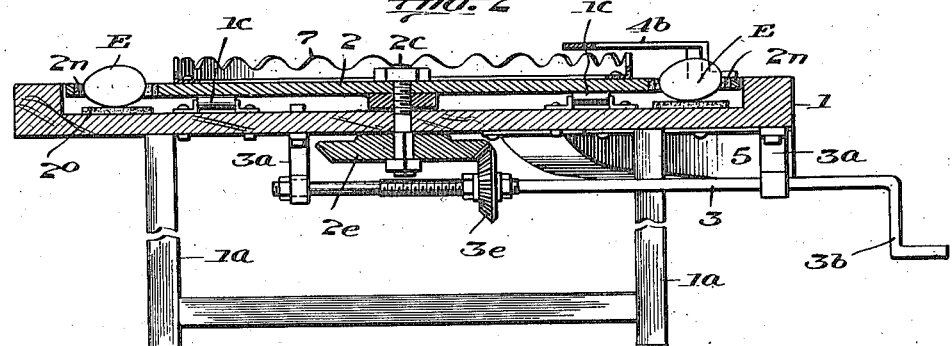

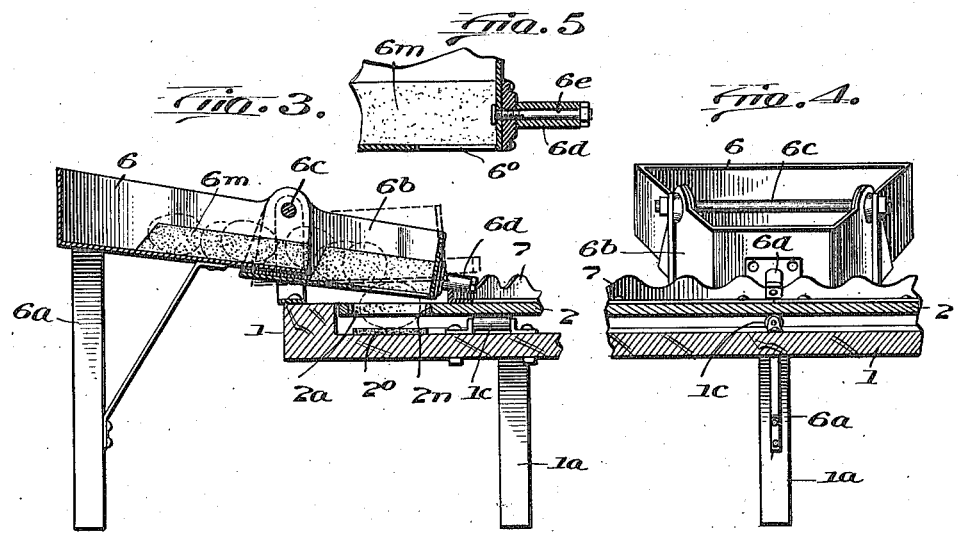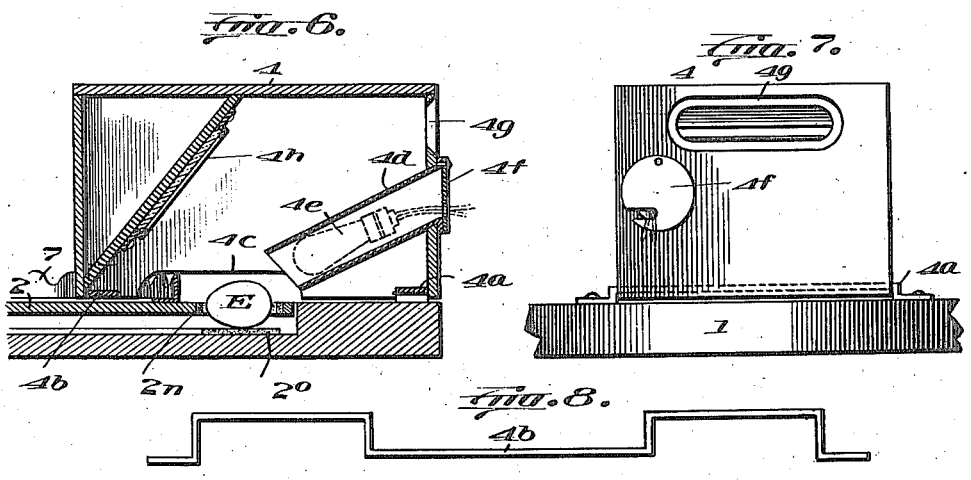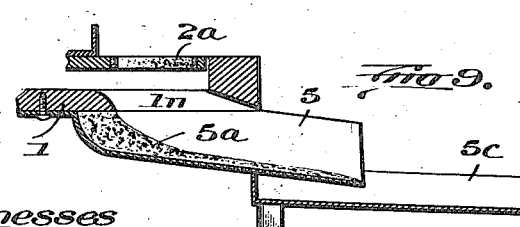

UNITED STATES PATENT OFFICE.

MATTIE R. HATFIELD, OF WICHITA, KANSAS.

EGG-INSPECTING MACHINE.

1,221,730.　　　　Specification of Letters Patent.　　Patented Apr. 3, 1917.

Application filed August 18, 1916.　Serial No. 115,622.

*To all whom it may concern:*

Be it known that I, Mrs. MATTIE R. HATFIELD, a citizen of the United States, residing at Wichita, in the county of Sedgwick and State of Kansas, have invented certain new and useful Improvements in Egg-Inspecting Machines; and I hereby declare that the following is a full, clear, and exact description thereof, reference being had to the accompanying drawings, which form part of this specification.

This invention is a novel machine for inspecting eggs to determine whether the same are good; and the object of the invention is to provide a machine by which the eggs can be inspected rapidly and with less manual handling by the operator. I have illustrated in the accompanying drawings one machine embodying the invention and will describe same with reference thereto and set forth in the claims the essential features and combinations of parts for which protection is desired.

In the drawings:

Figure 1 is a plan view of a complete machine.

Fig. 2 is a longitudinal section on line 2—2 Fig. 1.

Fig. 3 is an enlarged detail section on line 3—3 Fig. 1.

Fig. 4 is a right hand elevation of Fig. 3.

Fig. 5 is an enlarged detail section through the feed portion of the hopper.

Fig. 6 is an enlarged detail section on line 6—6 Fig. 1.

Fig. 7 is a right hand elevation of Fig. 6.

Fig. 8 is a detail view of one of the sight casing supports.

Fig. 9 is an enlarged section on line 9—9 Fig. 1.

As shown the machine comprises a table or plate 1 which may be mounted upon legs $1^a$ and may be formed of any suitable material, and preferably has a cylindric recess in its upper side. Mounted to rotate within this recess is an egg moving device, which is preferably a disk or wheel-like member 2 having an annular series of openings or pockets $2^a$ near its periphery; each pocket being large enough to accommodate one egg. This mover may be supported slightly above the surface of the table 1 within the recess by means of rollers $1^c$ as shown; and it may be rotated by any suitable means, a central stub shaft $2^c$ being shown attached to the axis of the disk, and extending through an axial opening in the table 1 and carrying a bevel gear $2^e$ on its lower end, which meshes with a bevel gear $3^e$ on the shaft 3 journaled in brackets $3^a$, which may be attached to the under side of the table 1; and said shaft may be provided with a crank handle $3^b$ by which it can be manually rotated.

I preferably place an annular pad $2^o$, of resilient or cushioning material such as felt or rubber, on the table 1 beneath the series of pockets $2^a$, on which pad the eggs E can roll; and the side and edges of the pockets $2^a$ in the egg mover may be covered with felt or other material, as at $2^n$, so as to prevent eggs being cracked or broken by contact with unyielding edges.

Arranged above the mover is a sight box 4, (Figs. 1, 6 and 7); which may be open at bottom, and is preferably placed on the machine above the mover 2 and adjacent the handle $3^b$, so that the operator while looking into the sight box can conveniently operate the mover. The sight box is shown as open at bottom and may be supported on bracket irons $4^a$, $4^b$ attached to the table 1. The lower edges of the sides of the sight box may be recessed as at $4^c$ to permit moving of the eggs underneath the box. In said box is a light tube $4^d$, which is directed toward the mover 2 and is adapted to concentrate the light from within the tube $4^d$ upon the eggs passing through the box adjacent the lower end of the tube. A light may be placed in this tube $4^d$, an electric light being indicated at $4^e$; but any desired kind of light may be used. The outer end of the tube $4^d$ may be closed by a door $4^f$ of any suitable construction.

In the front end of the box is a sight opening $4^g$ through which the operator can look and see the eggs reflected in a mirror $4^h$ which may be mounted within the box as indicated in the drawings, in such position that when the operator looks through the opening $4^g$ he will see reflected in the mirror the eggs passing through the box, and particularly the egg passing the end of the tube $4^d$, which egg will be brightly illuminated and the operator can tell by the reflected appearance of such egg whether it is good or bad; and he can remove any bad eggs that are detected after such egg has been moved out of the box.

To enable the operator to readily remove any bad eggs the pockets 2ª may be numbered, the numbers being applied at any desired points on the mover as indicated in Fig. 1 so that when the operator sees a bad egg he notes the number of the pocket in which this egg is, and when the pocket emerges from beneath the sight box he can remove the bad egg.

The good eggs are allowed to move on around the annulus 2ᶜ until they reach an opening 1ⁿ in the table 1 (Figs. 1 and 9) through which they pass into a chute 5 by which they may be directed into a suitable receiver 5ᶜ of any suitable construction. The chute 5 may be padded with cushioning material as at 5ª, to prevent eggs being cracked when they drop into the chute.

The eggs might be fed into the box 2ª by hand but I prefer to use an automatic feeder; which as shown comprises a hopper 6 which may be attached to the side of the table 1 and supported on legs 6ª; the inner portion 6ᵇ of the hopper 6 is shown as made separate from and hinged to the main portion thereof, (Figs. 1, 3 and 4) and the portion 6ᵇ may be hinged on a rod 6ᶜ (Figs. 6 and 7). The hopper is preferably inclined so that the eggs tend to roll by gravity from the part 6 into the part 6ᵇ; and part 6ᵇ may be vertically oscillated by means of a roller 6ᵈ, attached to a pin or stud 6ᵉ on the part 6ᵇ, which roller rides upon an annular flange or member 7 attached to the mover 2 adjacent to the inner edges of the pockets 2ª; and said flange 7 has its upper end serrated or undulated, there being one serration or projection intermediate each pair of pockets 2ª, the construction being such that as the mover 2 is rotated, the flange 7 moving therewith alternately causes the raising and lowering of the part 6ᵇ of the hopper, said part being lowered each time a pocket 2ª comes into register with the opening 6ᵒ in the bottom of the part 6ᵇ, allowing one egg to drop into the pocket 2ª see Figs. 1 and 3; and as the pusher rotates it moves this egg from beneath part 6ᵇ of the hopper, which part meanwhile is elevated, as indicated in dotted lines in Fig. 3, so that the eggs in the hopper will be held back; but part 6ᵇ is again lowered so as to permit another egg to drop into the next pocket as the latter comes into register with opening 6ᵒ.

The hopper 6 and the part 6ᵇ may be provided with cushioning material, indicated at 6ᵐ, to prevent the eggs being injured by contact with unyielding walls or hard surfaces.

Operation.

A quantity of eggs may be placed in the hopper 6 and the operator standing or sitting at the front of the machine so he can look into the sight box through opening 4ᵍ, turns handle 3ᵇ so as to rotate the mover; as each pocket passes beneath the feeder it receives an egg and moves such egg along through the sight box where it is illuminated; and if it is bad the operator will remove it from the pocket after it has emerged from the sight box; the good eggs will pass on to the opening 1ⁿ and escape by gravity through the opening 1ⁿ into the chute 5ª and into a collector or receiver.

In large machines the mover might be operated by power, but it can be operated by hand quickly and efficiently. I do not consider the invention limited to the details of construction or form and proportions of parts illustrated in the drawings as these can be varied to suit the designer or constructor within the scope of the invention; and therefore I have not attempted to show true proportions of parts but simply to give such information and illustration of the invention as will enable any one skilled in the art to adopt and use the same.

What I claim is:

1. In an egg testing apparatus the combination of a support, a movable member mounted thereon provided with pockets for receiving eggs, a discharge opening in the support through which the eggs escape from the pockets, and means for operating said member, with a sight box through which the eggs are passed, and an illuminating device whereby the condition of the eggs passing through the box can be determined.

2. An egg testing machine comprising a table, a member rotatably mounted on said table having an annular series of pockets adapted to receive eggs, said table having an opening for the discharge of eggs from the pockets, and a sight box mounted above this member and through which the eggs are passed as the member is rotated.

3. An egg testing machine comprising a support, a movable member having pockets adapted to receive eggs, a sight box and means for operating said movable member; a feed hopper having a movable part provided with an opening adapted to register with the pockets, and means for oscillating the movable part to cause the eggs to be discharged from the feeder into the pockets.

4. In an egg testing apparatus the combination of a stationary support, a rotatable member mounted on the table provided with pockets for receiving eggs; said support having an opening through which the eggs escape from the pockets, means for rotating said member, and a sight box through which the eggs are passed.

5. An egg testing machine comprising a table, a member rotatably mounted on said table having an annular series of pockets adapted to receive eggs, said table having an opening for the discharge of eggs from the pockets, and a sight box mounted above this member and through which the eggs are passed as the member is rotated, with manually operable means for rotating said member, and means for feeding eggs to the said member.

6. In an egg testing apparatus the combination of a stationary table, a rotatable member mounted on the table provided with pockets for receiving eggs; a discharge opening in the table through which the eggs escape from the pockets, means for operating said member, a sight box under which the eggs are passed, and illuminating devices whereby the condition of the eggs passing through the box is determined.

7. An egg testing machine comprising a table, a member rotatably mounted thereon having an annular series of pockets adapted to receive eggs, a sight box mounted above this member, an illuminating device adapted to illuminate eggs passing therethrough, a sight opening in the box, manually operable means for rotating said member, an opening in the table for the escape of eggs, and means for feeding eggs to the said member.

8. An egg testing machine comprising a table, a member rotatably mounted thereon having an annular series of pockets adapted to receive eggs, a sight box mounted above this member, an opening in the table for the escape of eggs, a hopper having a movable part provided with an opening adapted to register with the pockets, and means moving with the series of pockets for oscillating the said part so as to cause the eggs to be discharged therefrom into the pockets.

9. An egg testing machine comprising a support, a member rotatably mounted thereon having an annular series of pockets adapted to receive eggs, a sight box mounted above this member, an illuminating device adapted to illuminate eggs passing therethrough, means for rotating said member, a hopper having a movable part provided with an opening adapted to register with the pockets, and means moving with the series of pockets for oscillating the feeder so as to cause the eggs to be discharged from the feeder into the pockets, said support having a discharge opening through which the good eggs are discharged, and means for directing eggs away from the discharge opening.

In testimony that I claim the foregoing as my own, I affix my signature.

Mrs. MATTIE R. HATFIELD.